(12) United States Patent
Abelard

(10) Patent No.: US 12,728,558 B2
(45) Date of Patent: Sep. 8, 2026

(54) MACHINE TOOL STRUCTURE

(71) Applicant: ENGINEERING FRANCOIS ABELARD, Serres-Castet (FR)

(72) Inventor: François Abelard, Serres-Castet (FR)

(73) Assignee: ENGINEERING FRANCOIS ABELARD, Serres-Castet (FR)

( * ) Notice: Subject to any disclaimer, the term of this patent is extended or adjusted under 35 U.S.C. 154(b) by 585 days.

(21) Appl. No.: 18/250,665

(22) PCT Filed: Oct. 26, 2021

(86) PCT No.: PCT/EP2021/079730
§ 371 (c)(1),
(2) Date: Apr. 26, 2023

(87) PCT Pub. No.: WO2022/090261
PCT Pub. Date: May 5, 2022

(65) Prior Publication Data

US 2023/0405863 A1 Dec. 21, 2023

(30) Foreign Application Priority Data

Oct. 27, 2020 (FR) ....................................... 2011004

(51) Int. Cl.
*B23Q 1/01* (2006.01)
*B27C 1/14* (2006.01)

(52) U.S. Cl.
CPC ................ *B27C 1/14* (2013.01); *B23Q 1/015* (2013.01)

(58) Field of Classification Search
CPC ........ B23Q 1/015; B23Q 1/626; B23Q 1/012; B27C 5/02; B27C 5/06; B27M 1/08
See application file for complete search history.

(56) References Cited

U.S. PATENT DOCUMENTS 995,256 A * 6/1911 Kearney et al. ....... B23Q 1/015 451/449
2,759,378 A * 8/1956 Youssoufian ...... B23Q 11/0028 137/263

(Continued)

FOREIGN PATENT DOCUMENTS

DE 670 873 C 1/1939
DE 44 33 076 A1 3/1996

(Continued)

OTHER PUBLICATIONS

International Search Report as issued in International Patent Application No. PCT/EP2021/079730, dated Feb. 4, 2022.

*Primary Examiner* — Nicole N Ramos
(74) *Attorney, Agent, or Firm* — CUSHMAN PARTNERS, LLC

(57) ABSTRACT

A machine tool structure, in particular intended for milling pieces of wood, includes a frame including a bearing plate, a work table resting on the bearing plate and over which the pieces of wood to be milled are intended to be conveyed, an upper frame, support columns interposed between the bearing plate and the upper frame, the machine tool structure further including a tool-holder apron connected to translational drive members, interposed between the upper frame and the bearing plate, and configured to slidably drive the tool-holder apron between the work table and the upper frame.

10 Claims, 3 Drawing Sheets

(56) References Cited

U.S. PATENT DOCUMENTS

Figure 1:
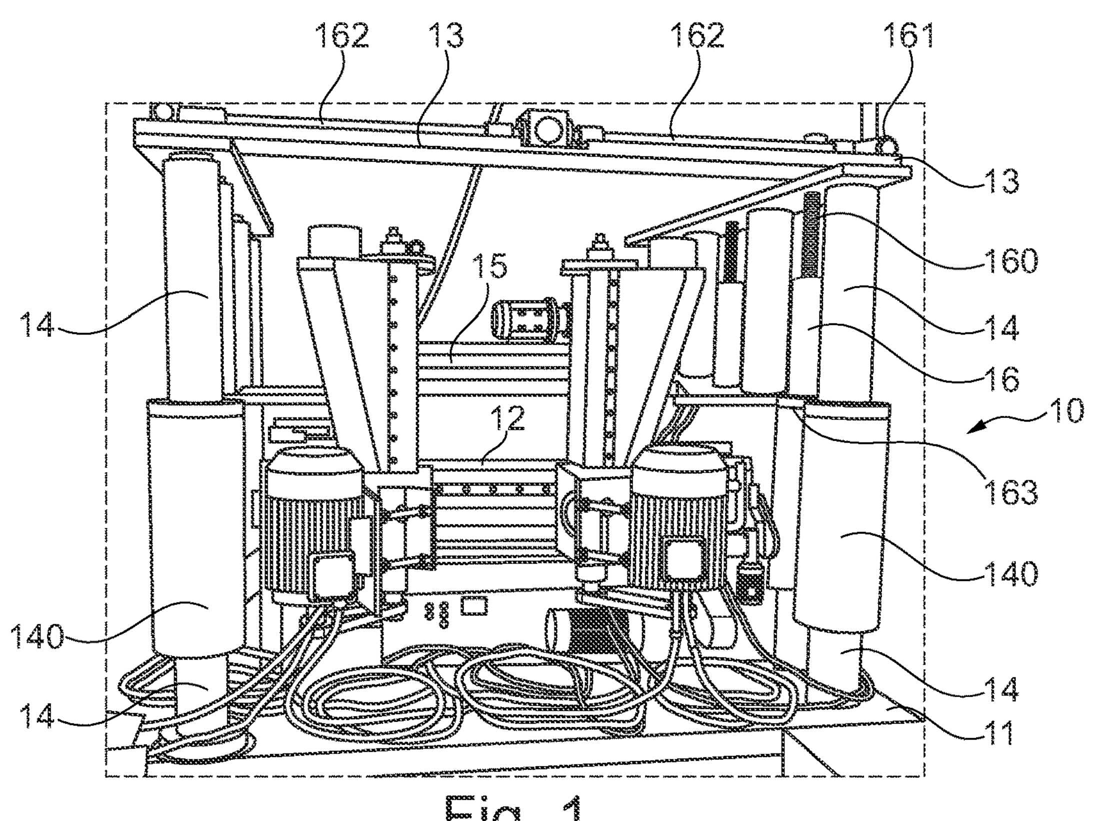

| | | | | | |
|---|---|---|---|---|---|
| 2,901,947 | A * | 9/1959 | Engel | B23C 1/00 | 409/238 |
| 3,027,813 | A * | 4/1962 | Seborg | B23Q 11/0028 | 33/645 |
| 3,650,178 | A * | 3/1972 | Appleton | B23Q 1/015 | 409/80 |
| 3,720,134 | A * | 3/1973 | Zeleny | B23Q 1/385 | 318/632 |
| 3,730,051 | A * | 5/1973 | Hatzig | B23Q 11/001 | 409/238 |
| 3,862,586 | A * | 1/1975 | Galbarini | B23Q 1/015 | 409/212 |
| 2008/0096746 | A1 * | 4/2008 | Ryuhan | B23Q 1/012 | 483/30 |

FOREIGN PATENT DOCUMENTS

| | | | | |
|---|---|---|---|---|
| DE | 602005001524 | T2 * | 3/2008 | B27C 5/02 |
| EP | 2098329 | A1 * | 9/2009 | B23Q 17/00 |
| WO | WO 2017/158059 | A1 | 9/2017 | |
| WO | WO 2017/158090 | A1 | 9/2017 | |

* cited by examiner

MACHINE TOOL STRUCTURE

CROSS-REFERENCE TO RELATED APPLICATIONS

This application is the U.S. National Stage of PCT/EP2021/079730, filed Oct. 26, 2021, which in turn claims priority to French patent application number 2011004 filed Oct. 27, 2020. The content of these applications are incorporated herein by reference in their entireties.

FIELD OF THE INVENTION

The present invention belongs to the field of machining, and in particular to the field of milling wood, and relates in particular to a machine tool structure in particular intended for planing.

PRIOR ART

In the field of machining, in particular milling wood, machine tools are known to form tree trunks into pieces of wood of predefined dimensions for use in the field of building construction.

In particular, planers are known that are suitable for transforming pieces of wood, typically logs, so as to first surface the pieces of wood, then milling them so as to produce beams or boards, for example, intended to constitute building frame parts.

Milling is performed by cutting tools driven in rotation and the piece of wood is translationally driven from an input to an output of the machine tool.

Planers for pieces of wood for framing usually have a fixed lower part forming a frame and comprising a worktable. The frame comprises lifting columns, for example made up of cylinders, connecting said frame to an upper part, forming a gantry. The gantry carries a cutting tool intended to plane an upper part of a piece of wood to be milled placed on the work table.

The lifting columns make it possible to modify the height of the cutting tool carried by the gantry, i.e. the distance between said cutting tool and the work table to vary one of the dimensions, here called thickness, of the pieces of framework produced.

To this end, the lifting columns are generally distributed around the worktable and comprise a cylinder forming a sheath fitted in the frame and wherein a cylinder rod mechanically linked to the upper part is adapted to slide.

However, the lifting columns of state-of-the-art machine tools do not allow large stroke distances to be achieved.

In addition, state-of-the-art machine tools do not have the possibility of changing their maximum stroke, e.g. in the case wherein large-size pieces of wood were to be milled.

In this case, only a substantial and costly modification of the machine tool is possible, or a complete change of the machine tool must be considered.

The disadvantages of a machine tool suitable for milling wood have previously been described, but it should be noted that these disadvantages can also be found on state-of-the-art machine tools suitable for machining other types of materials.

SUMMARY OF THE INVENTION

The purpose of the present invention is to remedy all or part of the disadvantages of the prior art, in particular those set out above.

For this purpose, a machine tool structure is provided by the present invention, in particular intended for the milling of pieces of wood, comprising a frame comprising:

a bearing plate, a work table resting on said plate and over which the pieces of wood to be milled are intended to be conveyed, an upper frame support columns interposed between the bearing plate and the upper frame.

The machine tool structure further comprises a tool-holder apron connected to translational drive members, interposed between the upper frame and the bearing plate, and configured to slidably drive the tool-holder apron between the work table and the upper frame.

In particular embodiments, the invention may further comprise one or more of the following characteristics, taken in isolation or according to all technically possible combinations.

According to one embodiment, the tool-holder apron comprises at least one carriage rigidly attached to it. According to one embodiment, the carriage is rigidly attached to a cylindrical sleeve. According to one embodiment, the carriage comprises an element cooperating with a drive member making it possible to move the carriage along an axis, preferably a vertical axis. The drive member may be, for example, a rack system, a pneumatic cylinder, a drive roller, or any other drive element. The drive member preferably comprises a motor element, such as an electric motor, a geared motor or any other motor element.

In particular embodiments, the translational drive members are formed by electric cylinders each comprising a worm screw attached by each of its ends respectively to the upper frame and the bearing plate, rotatably, said electric cylinders each further comprising a carriage cooperating with the worm screw by a helical link, said carriages being attached to the tool-holder apron.

In particular embodiments, the worm gears are driven in rotation by an angular gear device arranged on the upper frame and connected to each other by transmission shafts linked to an output shaft of an electric motor.

In particular embodiments, the machine tool structure comprises stabilizing means formed by cylindrical sleeves fitted freely translationally around support columns, said sleeves being rigidly attached to the carriages.

The cylindrical sleeves are attached to the tool-holder apron which is large, i.e. 160 millimeters to 200 millimeters in diameter. The cutting length is around 1,300 millimeters. Such a tool-holder apron allows the upper section to be milled with large laminated-bonded beams, which can be up to 1,000 millimeters thick, with a width of 1,200 millimeters and a length of 11,000 millimeters to 50,000 millimeters. The tool holder is preferably made of steel. The angular speed of the tool holder is preferably between 6,000 rpm and 8,000 rpm. The tool holder is preferably driven by a motor attached to the tool-holder apron.

In particular embodiments, the stabilizing means comprise flanges, each flange being attached to one end of a sleeve and comprising a through-hole through which a support column extends.

In particular embodiments, each carriage is interposed between and mechanically connected to two adjacent sleeves, a support column being arranged at each corner of the upper frame.

PRESENTATION OF THE FIGURES

Figure 2:
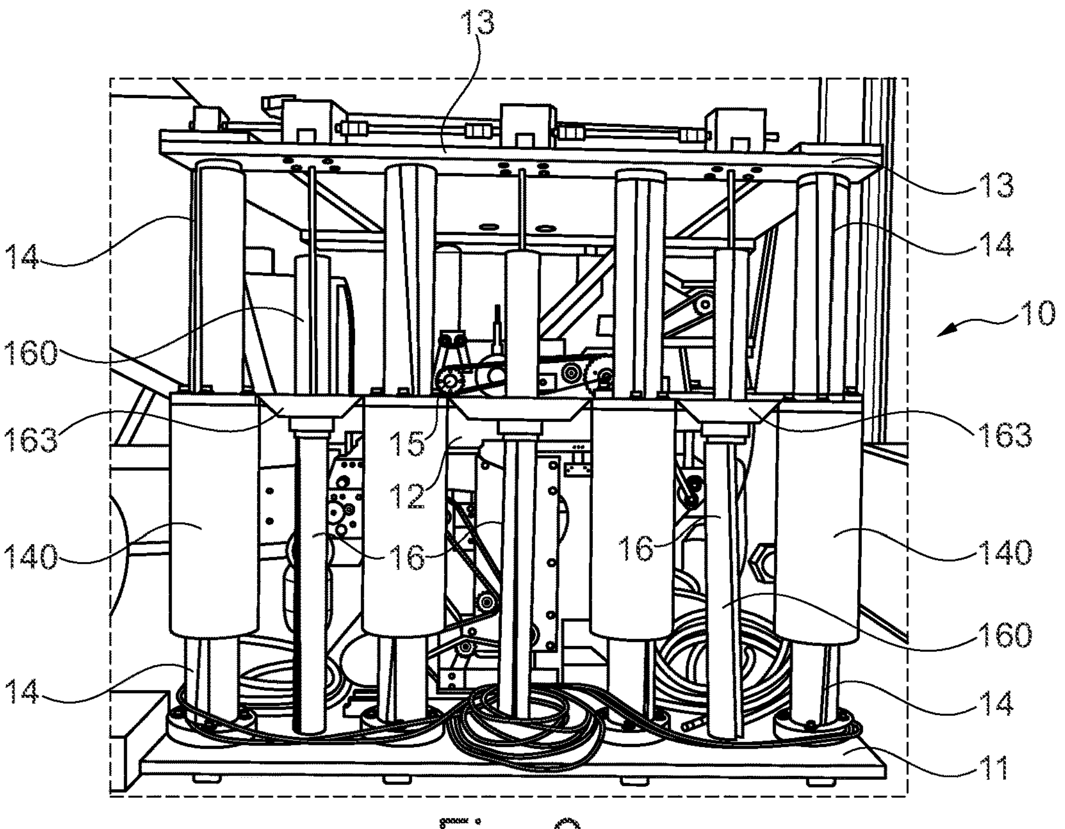
Figure 3:
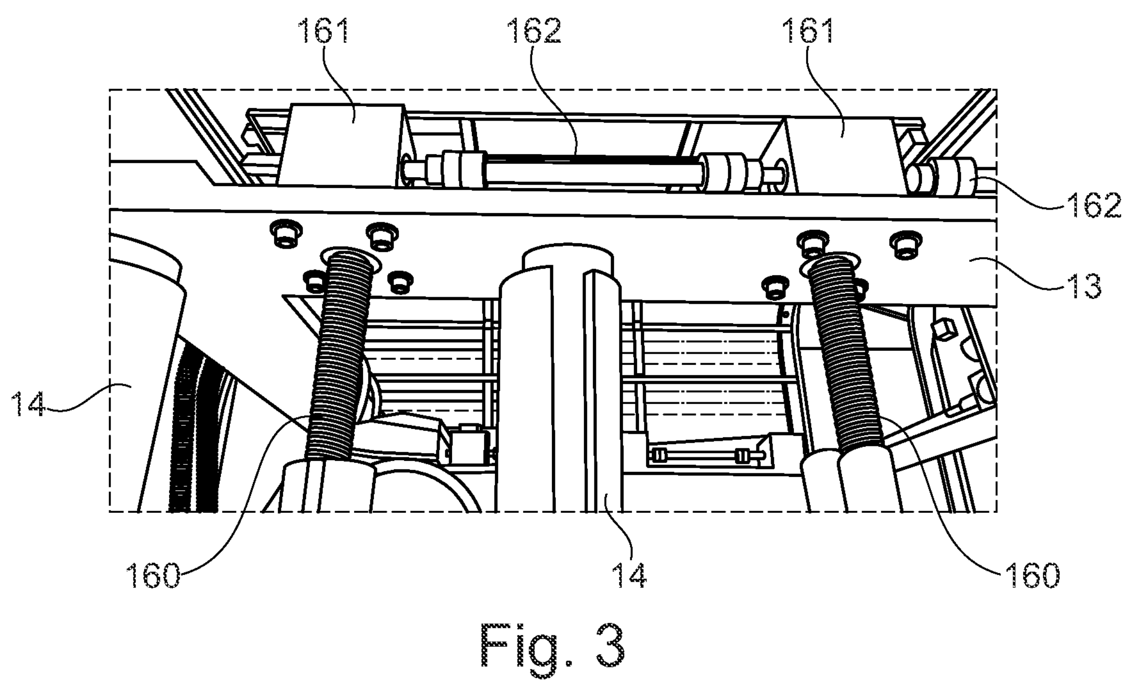
Figure 4:
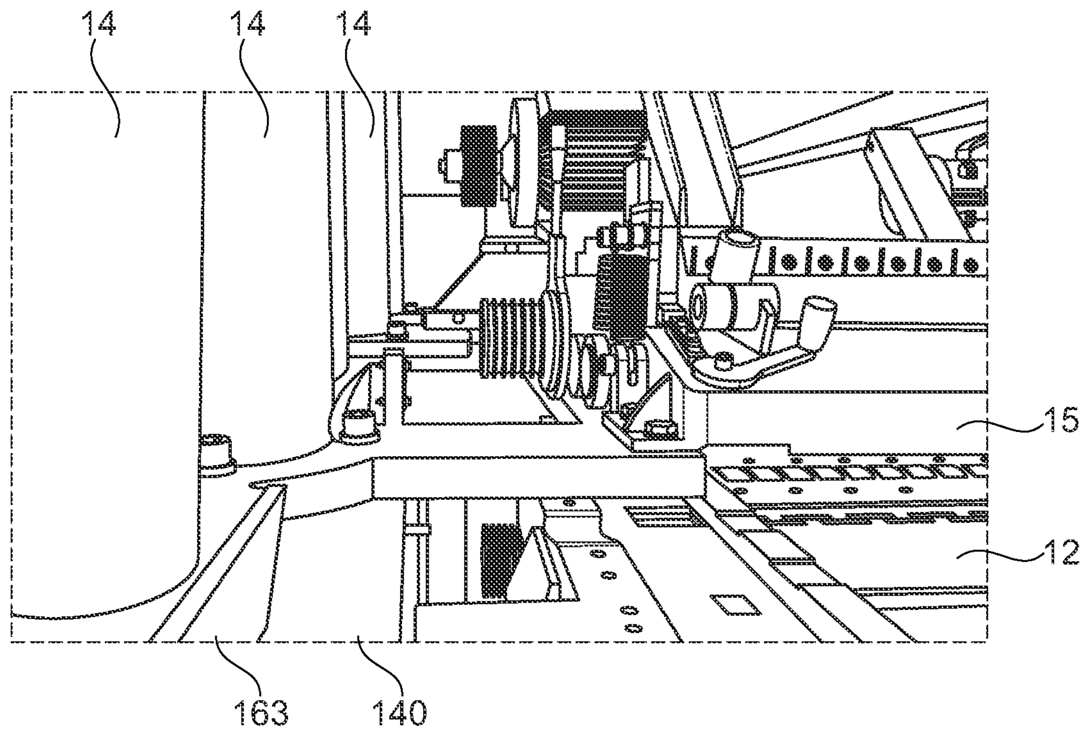
Figure 5:
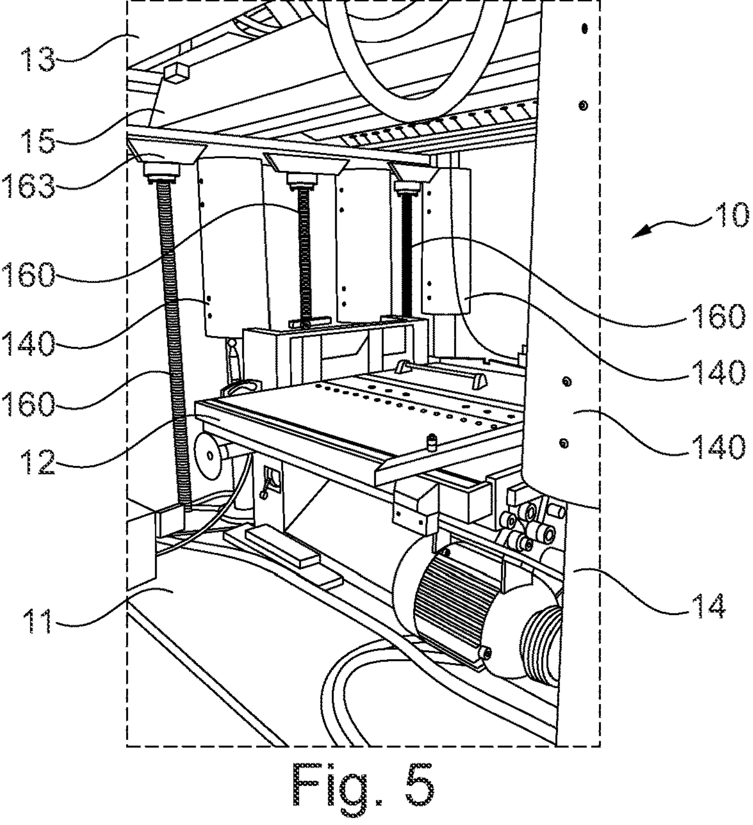
Figure 6:
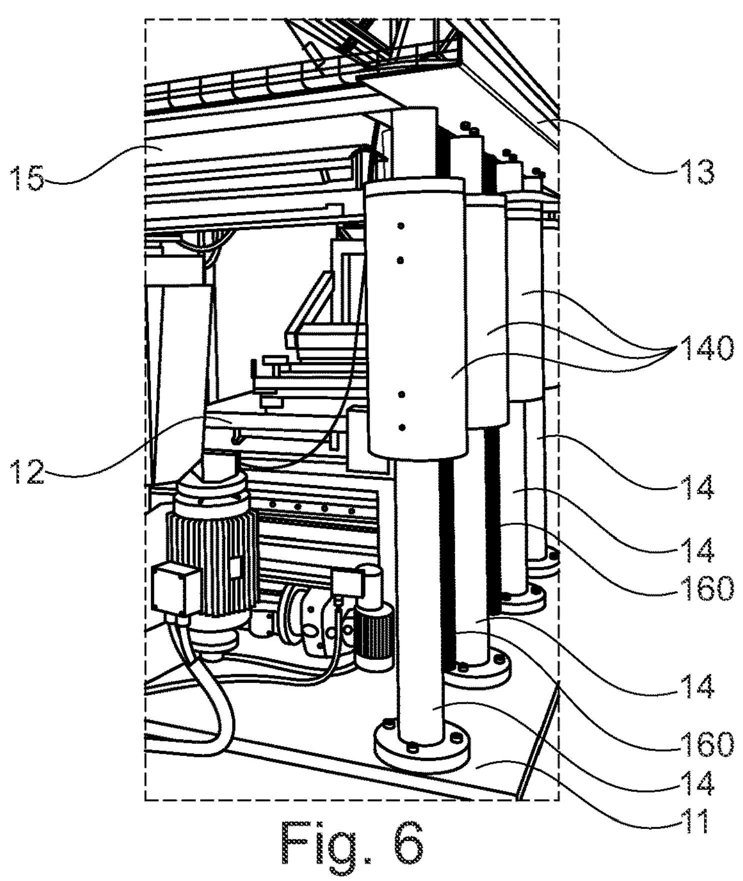

The invention will be better understood by reading the following description, given as a non-limiting example, and made in reference to the figures that show:

FIG. 1 a front view of a machine tool structure according to the present invention, FIG. 2 a side view of the machine tool structure of FIG. 1, FIG. 3 a detail view of FIG. 2, FIG. 4 a detail view of the connection between translational drive members and a tool-holder apron of the machine tool structure of FIG. 1, FIG. 5 a three-quarter view of a side of the machine tool structure of FIG. 1, FIG. 6 a three-quarter view of a side of the machine tool structure of FIG. 1.

In these figures, identical references from one figure to another designate identical or similar elements. For reasons of clarity, the elements shown are not necessarily on the same scale, unless mentioned otherwise.

It is hereby noted that the figures are not to scale.

DETAILED DESCRIPTION OF AN EMBODIMENT OF THE INVENTION

The present invention relates to a machine tool structure 10, in particular intended, in an application example, for milling wood, for example solid or laminated-bonded, and in particular for planing the latter.

It should be noted that the present invention may also apply, without structural modification, to a machine tool suitable for machining other types of materials.

The machine tool structure 10, as shown in FIG. 1, comprises a frame formed by a bearing plate 11, a work table 12 resting on said plate, an upper frame 13 and support columns 14 interposed between said upper frame 13 and said plate.

The machine tool structure 10 further comprises a tool-holder apron 15 for supporting, in the example embodiment shown in the figures and described hereinafter, a planing tool. A planing tool allows the thickness of the wooden piece to be adjusted according to a chosen dimension.

The tool-holder apron 15 is connected to translational drive members 16 provided to move it in translation between the upper frame 13 and the work table 12 and thus modify the cutting thickness of the planing tool.

The work table 12 is intended to receive a piece of wood to be milled and may advantageously comprise means of guiding and driving the piece of wood to be milled.

It should be specified that the drive members 16 and the support columns 14 are arranged on either side of the work table 12, as shown in FIGS. 1, 2, 5 and 6, on the sides of the frame of the machine tool structure 10, said sides defining a corridor along which the piece of wood to be machined is intended to be translationally driven by adapted devices known per se to those skilled in the art.

The machine tool structure 10 also supports tool holders for milling wood known as such to those skilled in the art. Such tool holders may be intended to carry tools suitable for planing or sawing pieces of wood translationally driven along the work table 12, so as to obtain finished products such as beams, boards, etc.

As the present invention relates to the structure of the machine tool 10, the arrangement of the tool holders will not be described hereinafter. In addition, this arrangement is within the reach of those skilled in the art.

Furthermore, in the present application only the machine tool structure 10 subject of the invention will be described and not the machine tool as a whole.

As shown in FIGS. 1, 2, 5 and 6, the drive members 16 are adapted to cause the tool-holder apron 15 to move in a vertical direction, between the upper frame 13 and the worktable 12.

The machine tool structure is preferably intended for the milling of laminated-bonded wooden beams. Before milling, these beams, made of glued and very tightly pressed wooden strips, are obtained in molds that make it possible to impose the desired dimensions and geometry. Typically, the machine tool structure makes it possible to obtain straight beams that are as straight as possible. It should be noted that before milling, the raw formwork beam has an extremely hard and unevenly distributed excess of glue on its exterior. Certain areas of the beam also have irregularities in the presence of wood materials. This gives rise to cutting forces which can be abrupt when the beam is milled by the tool holder 12.

These drive members 16 may advantageously be formed by electric cylinders each comprising a worm screw 160 extending between the upper frame 13 and the bearing plate 11, said worm screw 160 being connected to said upper frame 13 and said bearing plate by pivot links. The worm gears 160 are driven in rotation by suitable means, such as angular gear devices 161 arranged on the upper frame 13 and connected to each other by transmission shafts 162 themselves connected to an output shaft of an electric motor, for example by an angular gear device, as shown in FIGS. 1 to 3.

This particular arrangement of the movement transmission elements, i.e. transmission shafts 162 and the angular gear device 161, advantageously makes it possible to make any replacements or modifications to the support columns 14 and the worm screws 160, such as described hereinafter.

It should be noted that in FIGS. 1 to 4, the support columns 14 and the worm screws 160 appear surrounded by a protective sheath, and appear in FIGS. 5 and 6 without these protective sheaths.

The cylinders also each comprise a carriage 163 cooperating with the worm screw 160 by a helical link. The carriages 163 are rigidly linked to the tool-holder apron 15, as suggested in FIGS. 2, 4 and 5, i.e. linked according to a mechanical connection of the embedding type.

The rotation driving of the worm screws 160 therefore causes the tool-holder apron 15 to move in a direction opposite to the worktable or directed towards said table according to the rotation direction of said screws.

As shown in FIGS. 1 and 2, the machine tool structure 10 preferably comprises stabilizing means formed by the rigidly attached support columns 14, as described previously, by each of their ends, respectively to the upper frame 13 and the bearing plate 11. The role of these support columns 14 is in particular to hold said frame in a high position, away from the bearing plate 11, and are therefore preferably arranged so that a support column 14 supports each of the corners of said frame.

Sudden variations in cutting loads require the need to contain the jolts with stabilizing means which, moreover, are moved vertically when it is necessary to adjust the height of the tool-holder apron 15 in order to obtain the desired thickness dimension of the milled beam. The invention therefore makes it possible to adjust the cutting height of the pieces to be milled over large amplitudes while maintaining sufficient rigidity of the assembly to obtain a desired geometric quality during milling. In addition, the cutting height can be easily adjusted over a large range without having to dismantle the machine tool structure 10 in order to significantly change the desired cutting height. The machine tool structure 10 according to the invention therefore also allows significant time savings when the cutting height must be modified.

These stabilizers also allow resilience of the tool-holder apron assembly, that a single solid machine tool gantry could not handle. If the tool holder was mounted on a solid cast iron or mechanically welded frame, there would be a hyperstatic structure.

The stabilizing means comprise cylindrical sleeves 140 inserted freely in translation around each of the support columns 14. The sleeves 140 are rigidly attached to the carriages 163, as shown in FIGS. 2, 4 and 5, and make it possible to provide a guiding of the tool-holder apron 15 in translation when it is moved.

The structure according to the invention thus makes it possible to take up in the structure and in the cylindrical sleeves significant mechanical forces induced by the cutting of the wood. Such an architecture avoids excessive deformation of the structure which may cause a geometric displacement of the tool-holder apron 15 and thus harm the geometric quality of the pieces that have been milled.

Milling the upper part of the beams makes it possible to obtain a constant thickness with a surface condition that meets the specifications.

This invention eliminates, due to the resilience of the assembly, the vibrations which generate significant noise during operation of the machine.

According to one embodiment, the tool holder 15 includes tungsten carbide blades. This arrangement allows the adhesive and wood material to penetrate with flexibility. This arrangement therefore makes it possible to no longer have any machine stoppage during milling since the tool holder 15 assumes the function without damage.

In a preferred embodiment of the invention, the carriages 163 arranged on one side of the machine tool structure 10 are connected to each other by flanges with which they form a one-piece part, as can be seen in FIGS. 2 and 4. Each flange is rigidly attached to an upper end of a sleeve 140 and has a through-hole through which a support column 14 extends, such as can be seen in FIGS. 1, 2 and 4.

These characteristics make it possible to stiffen the machine tool structure 10 and increase the resistance to the mechanical stresses of the stabilizing means.

Advantageously, the sleeves 140 preferably have an inner chamber with respect to the support column 14 around which it is fitted, this inner chamber being provided for receiving a fatty body allowing the sliding of said sleeves 140 along said support columns 14.

Preferably, each drive member 16 is interposed between two adjacent stabilizing means, i.e., each carriage 163 is mechanically connected to two adjacent sleeves 140, a stabilizing means being arranged at each of the corners of the upper frame 13, as described previously.

The stabilizing means and in particular the support columns 14 advantageously make it possible to stiffen the structure of the machine tool 10 and to absorb the mechanical loads and stresses generated during the operation of the machine tool, in particular during the operation of the planing tool.

According to one embodiment of the invention, the machine tool structure 10 comprises eight support columns 14. These support columns 14 are preferably located on the periphery of the machine. They are preferably located between the bearing plate 11 and the upper frame 13. Preferably, each support column 14 is equipped with a stabilizing means.

According to one embodiment, at least one support column 14 comprises a foot that is connected to the bearing plate 11. According to this embodiment, the foot is equipped with an elastic seal. The presence of an elastic seal between the foot of the support column 13 and the bearing plate 11 advantageously avoids hyperstatism. According to one embodiment, each support column 13 includes an elastic seal.

In the example embodiment of the invention shown in the figures, the machine tool structure 10 comprises three stabilizing means and two drive members 16 arranged on each of its sides.

One of the advantages of the present invention is the modularity of said structure, in the sense that it is possible to provide more stabilizing means and drive members 16 without significant structural modifications to the machine tool. Such a layout allows, for example, the addition of a cutting or processing station for wood pieces upstream or downstream of the planing tool.

Structural modifications in the framework of a change in the machine tool, and therefore the number of stabilizing means and drive members 16, only consist of a possible modification of the upper frame 13 and the bearing plate 11, or an attachment of an additional frame and an additional plates.

In addition, it is also possible to easily increase the height displacement limit of the tool-holder apron 15 in order to increase the cutting thickness of the planing tool, to adapt to the dimensions of the piece of wood to be planed, for example by replacing only the support columns 14 and the worm screws 160 with others having a longer length.

Thanks to the characteristics of the invention, the machine tool structure 10 makes it possible to change a machine tool comprising said structure simply, quickly and without generating substantial additional cost.

In other words, the present invention makes it possible to change the cutting thickness limits of the machine tool according to the dimensions of the pieces of wood to be milled and to add stations for cutting or processing pieces of wood, without modifying the tool-holder apron 15, or the work table 12, or any tool holders or the movement transmission elements, thanks to the special arrangement of the support columns 14 and of the drive members 16.

Specifically, as the drive members 16 and the stabilizing means are arranged on the sides of the machine tool structure 10 and are not integrated into the work table 12 and the tool-holder apron 15, they can be modified or replaced so as to vary the limit parameters of the machine tool, such as the maximum travel of the tool-holder apron 15, without requiring any further modifications to the structure of said machine tool.

Another advantage of the present invention resides in the fact that, changing the support columns 14 and worm screws 160 to obtain a longer stroke of the tool-holder apron 15 is not accompanied by a change in the minimum cutting thickness. This means that changing the support columns 14 and the worm screws 160 only varies the maximum cutting thickness.

Thanks to this advantage that makes it possible to maintain the minimum cutting thickness of the machine tool, said machine tool is particularly versatile and can mill pieces of wood of a wide range of sizes.

Furthermore, the arrangement of the machine tool structure 10 according to the present invention allowing the movement of the tool-holder apron 15 between the upper frame 13 and the work table 12, the stroke of said tool-holder apron 15 is significantly greater than that of the state-of-the-art machine tool aprons.

More generally, it should be noted that the embodiments considered above have been described as non-limiting examples, and that other variants can therefore be considered.

The invention claimed is:

1. A machine tool structure that comprises a frame comprising:

a bearing plate, a work table resting on said bearing plate and over which pieces of wood to be milled are intended to be conveyed, an upper frame, support columns interposed between the bearing plate and the upper frame, the machine tool structure further comprising a tool-holder connected to translational drive members, interposed between said upper frame and the bearing plate, and configured to slide the tool-holder between the work table and the upper frame, and a stabilizing system comprising cylindrical sleeves rigidly attached to the tool-holder and to the support columns, the cylindrical sleeves being fitted around the support columns to guide the tool-holder in translation when being slided by the translational drive members.

2. The machine tool structure according to claim 1, wherein the translational drive members are formed by electric cylinders each comprising a worm screw, the worm screw having a first end attached to the upper frame and a second end attached to the bearing plate, rotatably, said electric cylinders each further comprising a carriage cooperating with the worm screw by a helical link, said carriages being attached to the tool-holder.

3. The machine tool structure of claim 2, wherein the worm gears are rotated by angular gear devices arranged on the upper frame and connected to each other by transmission shafts linked to an output shaft of an electric motor.

4. The machine tool structure of claim 1, wherein the stabilizing system comprises flanges, each flange being attached to one end of one of the cylindrical sleeves and having a through-hole through which a one of the support columns extends.

5. The machine tool structure according to claim 1, wherein the machine tool structure further comprises carriages attached to the tool-holder, each carriage being interposed between and fixed to two adjacent cylindrical sleeves of the cylindrical sleeves.

6. The machine tool structure according to claim 1, wherein each support column among the support columns comprising a first end attached to the bearing plate and a second end attached to the upper frame.

7. The machine tool structure of claim 1, wherein each support column among the support columns comprising a first end attached to the bearing plate and a second end attached to the upper frame, the stabilizing system further comprising flanges, each flange being fixed to one end of one of the cylindrical sleeves and having a through-hole through which one of the support columns extends, each flange being fixed to the tool-holder.

8. The machine tool structure according to claim 1, wherein the machine tool structure further comprises carriages attached to the tool-holder, the carriages being fixed to the cylindrical sleeves.

9. The machine tool structure of claim 1, wherein the machine tool structure further comprises carriages attached to the tool-holder, each carriage being interposed between and fixed relative to two adjacent cylindrical sleeves taken among the cylindrical sleeves, support columns taken among the support columns being arranged at each corner of the upper frame.

10. The machine tool structure of claim 1, further comprising a planing tool supported by the tool-holder, the planing tool being configured to adjust a thickness of a wooden piece supported by the bearing plate.

* * * * *